US007001069B2

(12) United States Patent
Phipps

(10) Patent No.: US 7,001,069 B2
(45) Date of Patent: Feb. 21, 2006

(54) TEMPERATURE SENSOR WITH ENHANCED AMBIENT AIR TEMPERATURE DETECTION

(76) Inventor: Jack M. Phipps, P.O. Box 2129, McKinney, TX (US) 75070

(*) Notice: Subject to any disclaimer, the term of this patent is extended or adjusted under 35 U.S.C. 154(b) by 0 days.

(21) Appl. No.: 10/836,596

(22) Filed: May 3, 2004

(65) Prior Publication Data

US 2005/0058179 A1 Mar. 17, 2005

Related U.S. Application Data

(63) Continuation of application No. PCT/US02/31613, filed on Nov. 1, 2002.

(60) Provisional application No. 60/330,912, filed on Nov. 2, 2001.

(51) Int. Cl.
*G01K 1/16* (2006.01)
*G01K 13/02* (2006.01)

(52) U.S. Cl. ........................ 374/208; 374/109

(58) Field of Classification Search ............ 374/29, 374/100, 147, 148, 208, 138, 135, 109; 73/866.5
See application file for complete search history.

(56) References Cited

U.S. PATENT DOCUMENTS

| | | | |
|---|---|---|---|
| 2,410,098 A | 10/1946 | Muller | |
| 2,525,361 A * | 10/1950 | Lamb | 374/138 |
| 2,970,475 A * | 2/1961 | Werner | 374/138 |
| 3,559,486 A | 2/1971 | Gormar | |
| 3,673,870 A * | 7/1972 | Jalbert | 374/138 |
| 3,716,450 A | 2/1973 | Lions | |
| 3,751,305 A | 8/1973 | Huebscher | |
| 3,776,039 A | 12/1973 | Bowen | |
| 3,845,661 A | 11/1974 | Hollweck | |
| 3,929,018 A | 12/1975 | Turner | |
| 4,152,938 A * | 5/1979 | Danninger | 374/138 |
| 4,318,073 A | 3/1982 | Rossler | |
| 4,403,872 A * | 9/1983 | DeLeo | 374/138 |
| 4,423,967 A * | 1/1984 | Mouton | 374/138 |
| 4,464,066 A | 8/1984 | Cappuccilli | |
| 4,575,705 A | 3/1986 | Gotcher | |
| 4,588,306 A | 5/1986 | Burger | |
| 4,659,236 A | 4/1987 | Hobbs | |
| 4,729,672 A | 3/1988 | Takagi et al. | |
| 4,881,822 A * | 11/1989 | Ridenour | 374/109 |
| 4,929,093 A | 5/1990 | Suzuki et al. | |
| 5,022,766 A * | 6/1991 | Phipps | 374/209 |
| 5,348,395 A * | 9/1994 | Corr et al. | 374/135 |

(Continued)

FOREIGN PATENT DOCUMENTS

DE 3918245 A1 12/1990

(Continued)

OTHER PUBLICATIONS

International Search Report dated Apr. 8, 2003, in International Application No. PCT/US02/31613 filed Nov. 1, 2002 (2 pages).

*Primary Examiner*—Gail Verbitsky
(74) *Attorney, Agent, or Firm*—Shlesinger, Arkwright & Garvey LLP

(57) ABSTRACT

The inventive temperature sensor 10 may include a housing having an upper portion 18 and a lower portion 22. Upper portion 18 may include a cap 24 and a base 26. Cap 24 and base 26 may define a fluid passage 70 which is configured for enhancing the flow of ambient air into the region of a wall 60. A hole 54 may extend into wall 60 and be sized for receiving a temperature sensor 14 therein. In that manner, a temperature sensing device 58, such as a thermistor, may accurately and precisely measure the temperature of ambient air, while being protected by wall 60.

12 Claims, 6 Drawing Sheets

U.S. PATENT DOCUMENTS

| | | | | |
|---|---|---|---|---|
| 5,462,359 A | * | 10/1995 | Reichl et al. | 374/148 |
| 5,764,130 A | * | 6/1998 | Straub et al. | 338/28 |
| 5,829,880 A | * | 11/1998 | Diedrich | 374/208 |
| 5,996,357 A | | 12/1999 | Park | |
| 6,076,963 A | * | 6/2000 | Menzies et al. | 374/138 |
| 6,270,253 B1 | * | 8/2001 | Keller | 374/138 |
| 6,374,685 B1 | * | 4/2002 | Daly | 73/866.5 |
| 6,599,012 B1 | * | 7/2003 | Gul | 374/208 |
| 6,827,485 B1 | * | 12/2004 | Isebrand | 374/141 |
| 2002/0039378 A1 | * | 4/2002 | Shibayama | 374/148 |
| 2002/0144559 A1 | * | 10/2002 | Bueno Harto et al. | 73/866.5 |
| 2005/0039551 A1 | * | 2/2005 | Shute et al. | 73/866.5 |
| 2005/0089082 A1 | * | 4/2005 | Anderson et al. | 374/208 |

FOREIGN PATENT DOCUMENTS

| | | |
|---|---|---|
| GB | 2035553 A | 6/1980 |
| JP | 0199925 | 12/1982 |
| WO | 03/040673 A2 | 5/2003 |
| WO | 03/040673 A3 | 5/2003 |

* cited by examiner

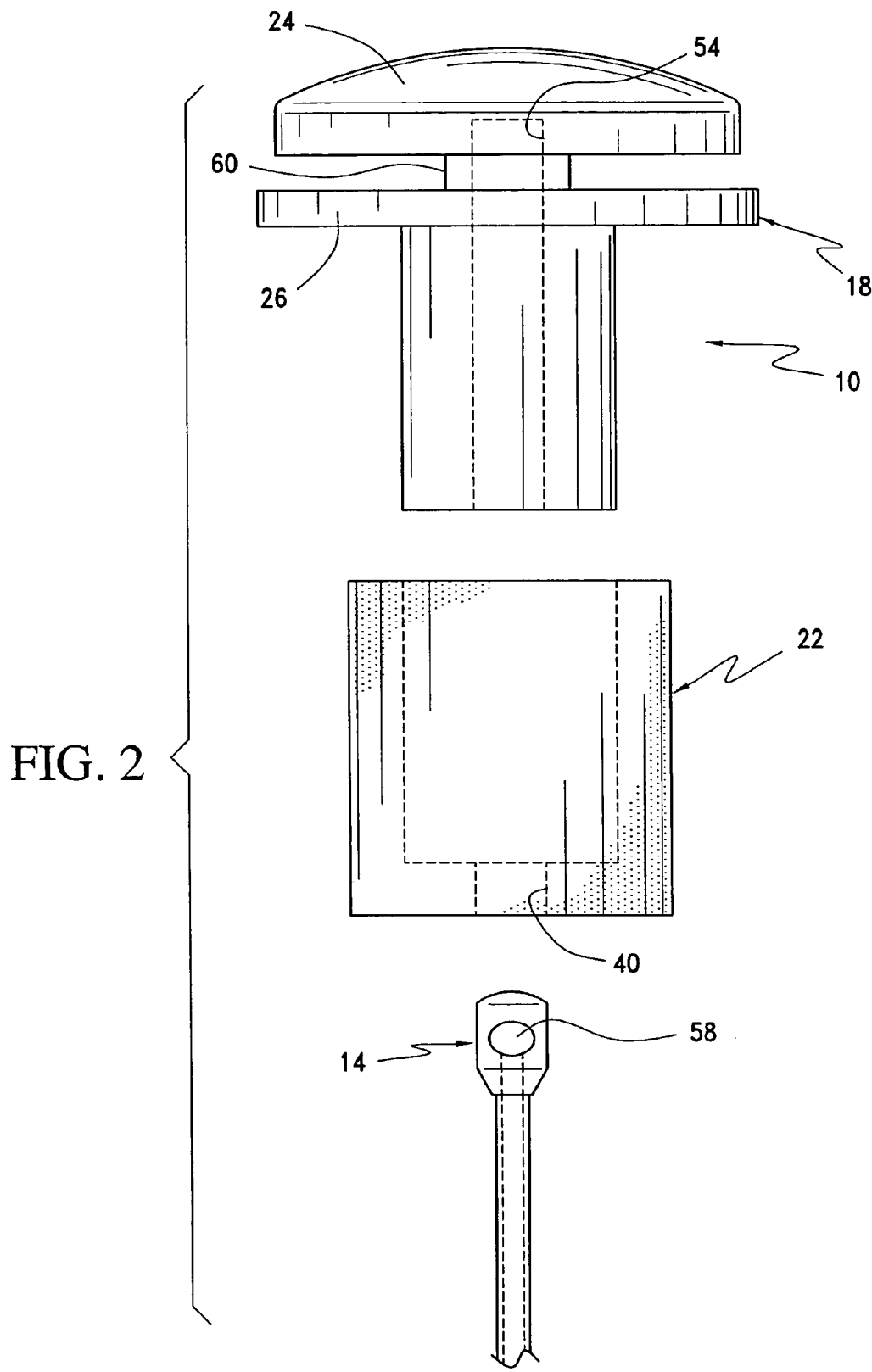

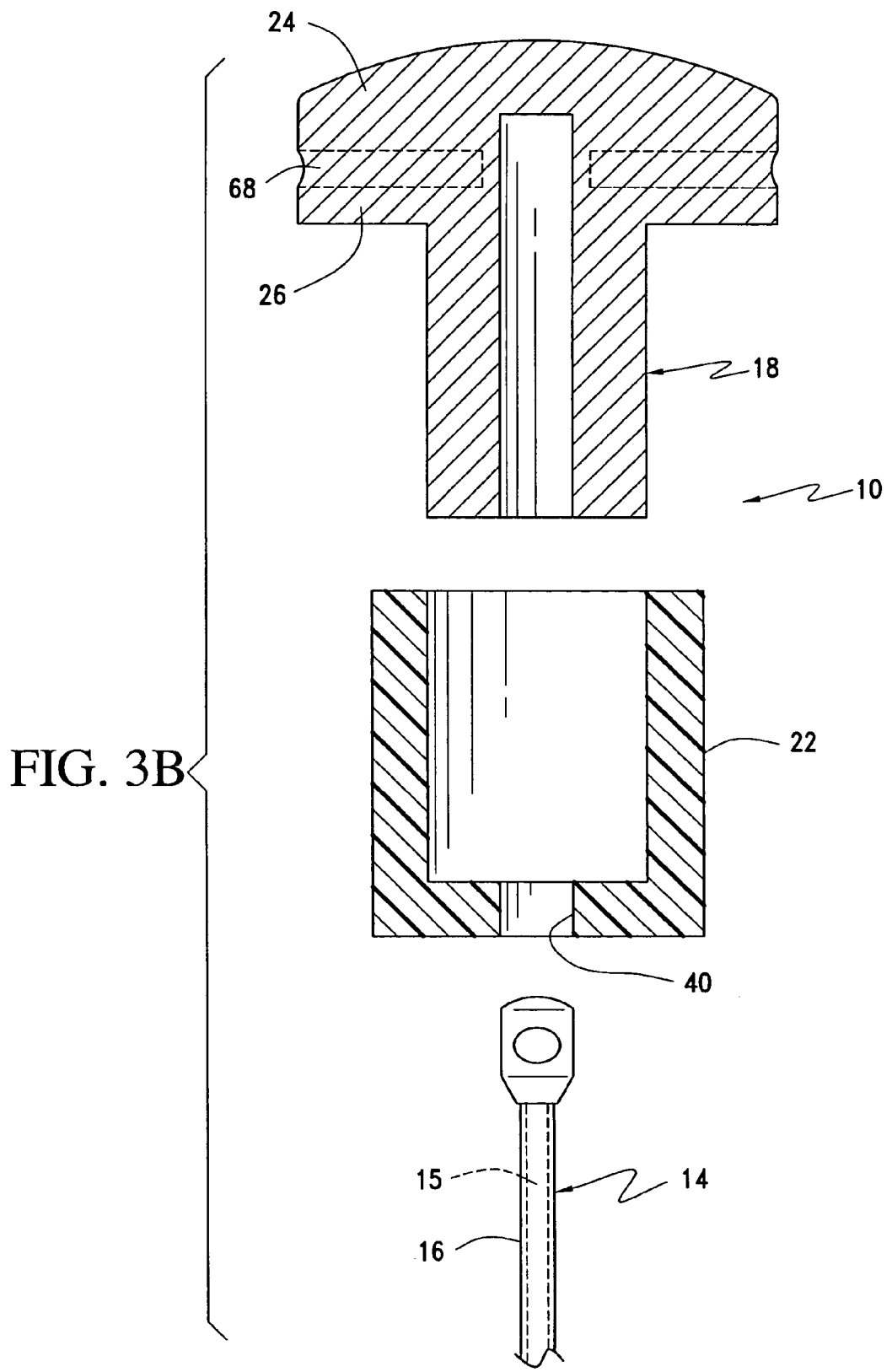

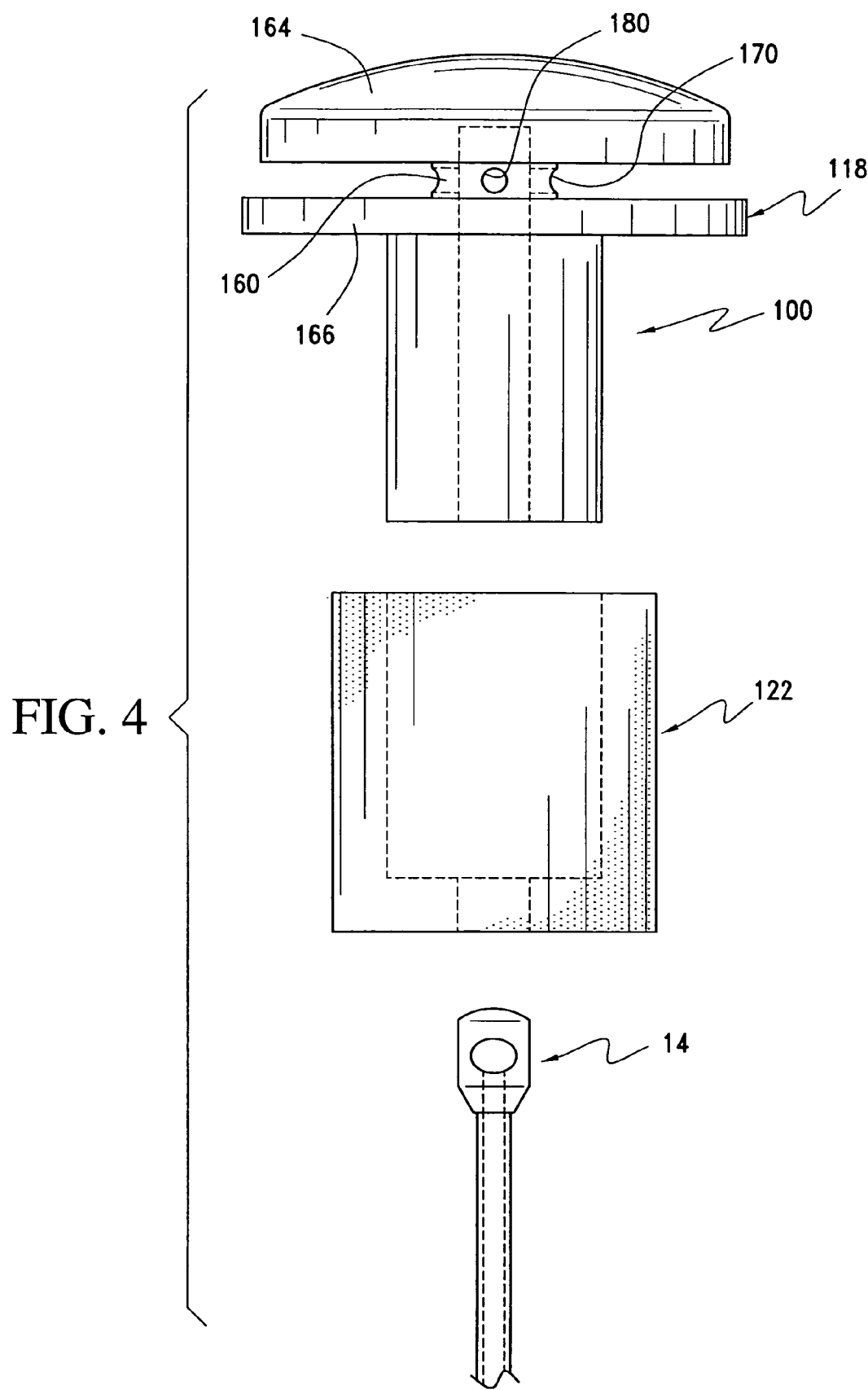

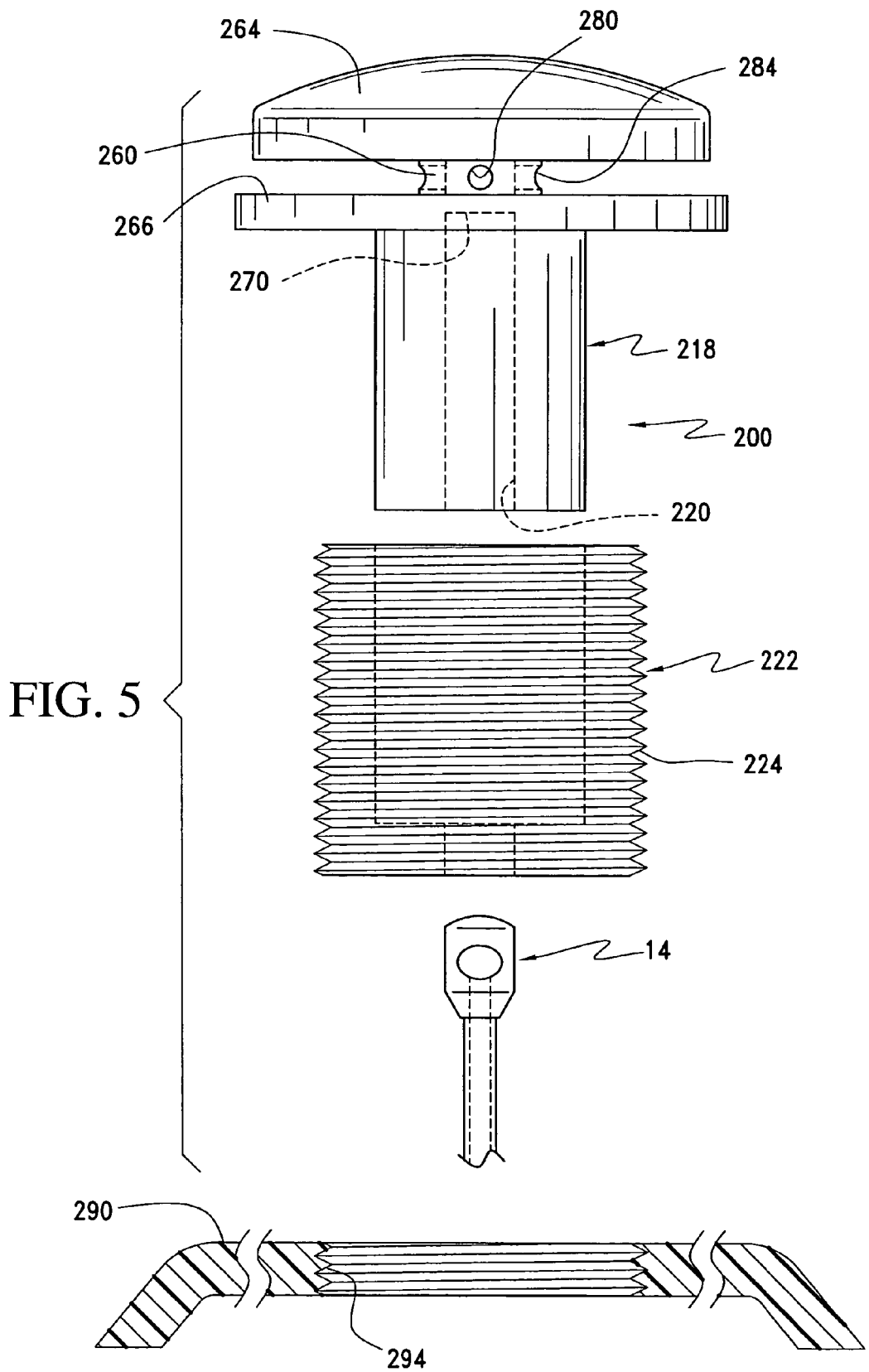

TEMPERATURE SENSOR WITH ENHANCED AMBIENT AIR TEMPERATURE DETECTION

CROSS-REFERENCE TO RELATED APPLICATIONS

This application is a continuation application of International Application No. PCT/US02/31613, filed 1 Nov. 2002 which claims the convention priority of U.S. Provisional Application No. 60/330,912, filed Nov. 2, 2001, and each of which is incorporated herein by reference.

FIELD OF THE INVENTION

The invention relates to temperature sensors. More particularly, the invention relates to temperature sensing devices and devices for enhancing the accuracy of the temperature sensing device and for protecting the temperature sensing device. Even more specifically, the invention relates to a temperature sensor, which may be used in a housing having enhanced ambient air flow, physical protection, and thermal transmission accuracy for the temperature sensor.

BACKGROUND OF THE INVENTION

Temperature sensors are known.

An example of a known temperature sensor is set forth in U.S. Pat. No. 5,022,766 to Phipps, which is incorporated herein by reference.

Additional known devices are set forth in the References Cited section of U.S. Pat. No. 5,022,766 to Phipps, namely:
U.S. Pat. No. 3,716,450 to Lions
U.S. Pat. No. 3,751,305 to Huebscher
U.S. Pat. No. 3,776,039 to Bowen
U.S. Pat. No. 3,845,661 to Hollweck
U.S. Pat. No. 3,929,018 to Turner
U.S. Pat. No. 4,318,073 to Rossler
U.S. Pat. No. 4,575,705 to Gotcher
U.S. Pat. No. 4,588,306 to Burger
U.S. Pat. No. 4,659,236 to Hobbs
U.S. Pat. No. 4,729,672 to Takagi et al.
U.S. Pat. No. 4,929,093 to Suzuki et al. and
JP 0199925, dated December 1982

OBJECTS AND SUMMARY OF THE INVENTION

An object of the invention is to provide a temperature sensor and temperature sensor housing which overcome the drawbacks of known devices.

Another object of the invention is to provide a temperature sensor and housing which is more accurate and precise owing to its enhanced housing, for example.

Another object of invention is to provide a temperature sensor and housing which has enhanced physical protection of sensitive elements, such as a thermistor.

A further object of invention is to provide a temperature sensor and housing which operates without contact with ambient air.

Yet, another object of the invention is to provide a temperature sensor and housing having enhanced contact with the ambient air for increasing the circulation of ambient air in the vicinity of a thermistor, for example.

Another object of the invention is to provide a temperature sensor and housing having enhanced contact with the ambient air for increasing the circulation of ambient air in the vicinity of a thermistor, yet, with enhancing resistance of the housing to tampering which might hurt the temperature sensing elements housed therein.

Another object of the invention is to provide a temperature sensor and housing which reduces the effects of transient temperature increases or temperature spikes present in the ambient environment in which the ambient temperature is being sensed.

In summary, therefore, the invention is directed to a temperature sensor and housing, which housing enhances the flow of ambient air to and in the vicinity of the temperature sensor, so that the temperature sensor provides more accurate and more precise readings than known devices.

These and other objects and advantages of the invention will be set forth in greater detail below.

Relative terms such as up, down, top, bottom, left, and right are for convenience only and are not intended to be limiting.

BRIEF DESCRIPTION OF THE DRAWINGS

FIG. 2 is an exploded side view of a temperature sensor and housing of the FIG. 1 embodiment of the invention;

FIG. 3B is a sectional view of the embodiment of FIG. 3A;

FIG. 4 is an exploded, side view of a further embodiment of a temperature sensor and housing according to the invention, shown in a manner similar to FIG. 2; and FIG. 5 is another exploded, side view of another embodiment of a temperature sensor and housing according to the invention, shown in a manner similar to FIG. 4.

DETAILED DESCRIPTION OF THE INVENTION

Figure 1:
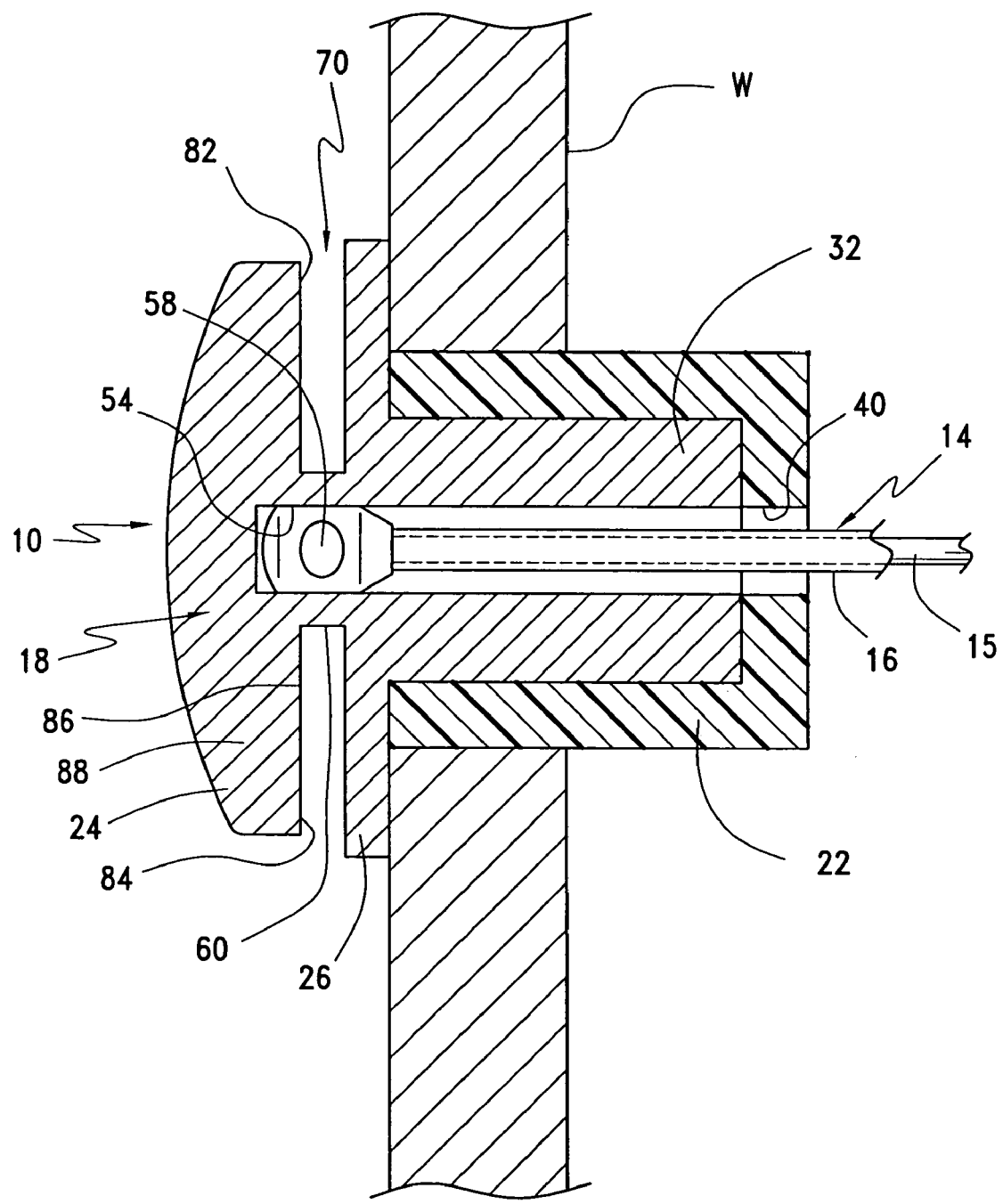
FIG. 1 is a cross sectional view of an embodiment of a temperature sensor and housing according to the invention shown mounted to a wall W.

FIGS. 1 and 2 illustrate an embodiment of a temperature sensor and housing 10 according to the invention.

Temperature sensor and housing 10 may include an upper portion 18 and a lower portion or housing 22.

Lower portion 22 may be made of an insulating material to insulate upper portion 18, and hence, temperature sensor 14 disposed therein, from the thermal effects of the temperature of wall W, for example. One or more wires 15, which may be protected by a plastic covering 16, may connect temperature sensor 14 to a control unit.

Upper portion 18 may include a cap or button 24 and a base 26. An extension 32 may be provided on base 26. Extension 32 may extend outwardly away from base 26 for assisting in securing upper portion 18 to wall W.

Lower portion 22 may be configured for surrounding at least a portion of extension 32. Lower portion 22 may be sized to tightly or loosely engage extension 32. Extension 32 and the mating portion of lower portion 22 may be cylindrical to allow mating in any orientation, or configured as a right triangular, rectangular, or pentagonal cylinder and the like to resist rotation of extension 32 and lower portion 22 relative to each other.

As shown in FIGS. 1 and 2, temperature sensor 14, in use, may extend through an opening or hole or openings 40 in lower portion 22, extend leftwardly, as viewed in FIG. 1, through lower portion 22, and into a further opening or hole 54 in upper portion 18. Hole 54 may be separate from or an extension of opening or hole 40.

A temperature sensing element 58 of temperature sensor 14 may be disposed, in use, adjacent cap portion 24. The temperature sensing element 58 may likewise be provided, in use, adjacent a wall 60 of upper portion 18. Wall 60 may be sized to enhance the transmission of temperature changes effected by ambient air flowing into an opening or passage 70 of upper portion 18 and into contact with and past, for example, wall 60. By "sized" it will be understood that it is meant that the physical configuration, wall thickness, total mass of wall 60, thermal transmission, and other physical characteristics are meant.

In addition to the above, air flow past, as well as substantially stationary air contacting button 24, will, depending on the material used for button 24, likewise assist in transmitting the air temperature through respective button portions 82, 84, 86, 88 and wall portion 60 to temperature sensing element 58.

Portions 82, 84, 86 and 88 are merely examples. Any and all portions of upper portion 18 may be sized, configured, and made of materials selected to achieve the desired thermal transmission characteristics.

In the case where upper portion 18, and in particular wall 60, is made of a relatively highly thermally conductive material, including metals such as aluminum, the thickness of wall 60 may, depending on the intended use, be thicker than in the case where upper portion 18 is made of a relatively less thermally conductive material, such as wood.

Even in the case where wood is used, by selecting the thickness of a wooden wall 60 appropriately, as well as by calibrating the central control unit for an associated heating, ventilating and air conditioning (HVAC) sensor, desired results may still be achieved.

Figure 3A:
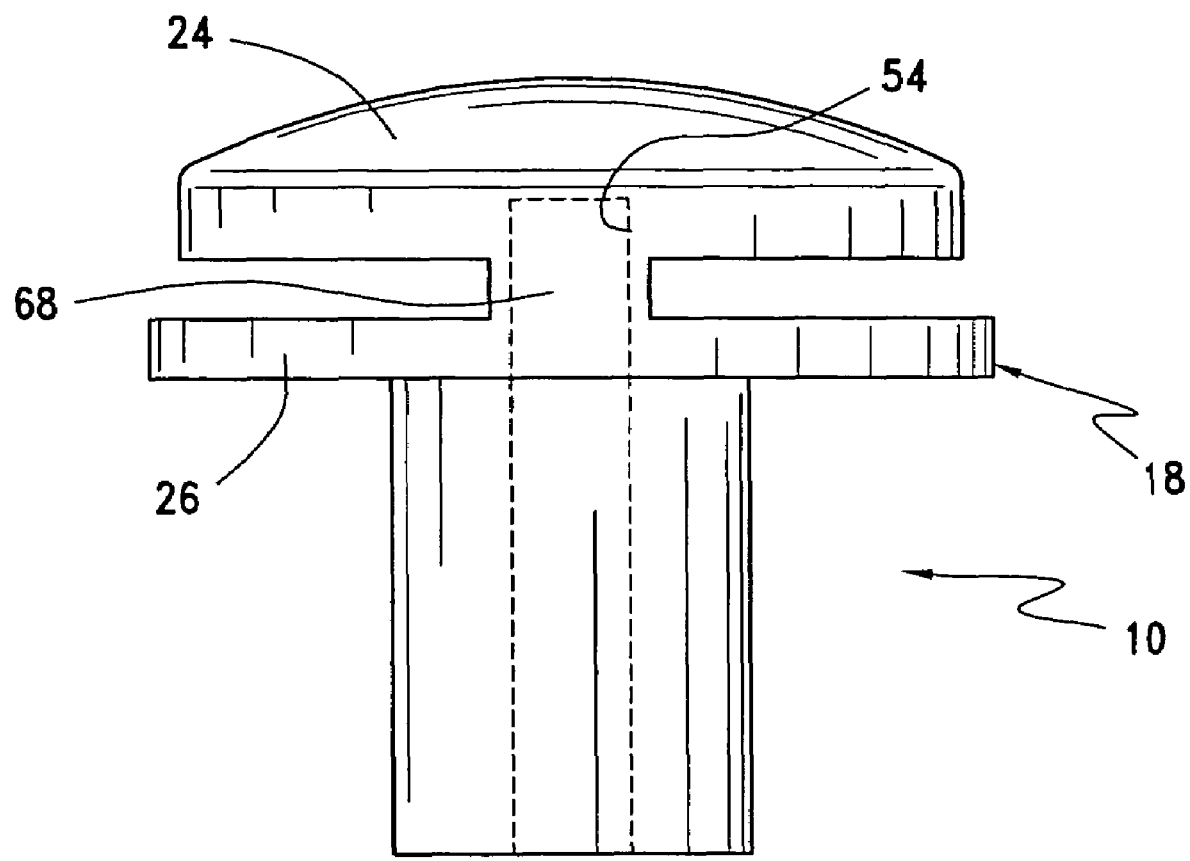
FIG. 3A is an exploded, view of another embodiment of the invention.

An elongated wall 68 may be provided as shown in the embodiment of FIGS. 3A and 3B. Wall 68 may be further appreciated by considering FIG. 3B. Wall 68 may be configured as a web extending partially or completely across the extent of one or both of button 24 and base 26. Wall 68 may be sized and configured for an enhancing ambient air circulation in the vicinity of temperature sensor 14 disposed in hole 54. Wall 68 may have shaped portion, such as the illustrated curvage portion, at outer three ends in order to enhance air flow, as well as increase resistance to tampering, for example. Wall 68 may be made of the same as, or different materials from, one or both of cap 24 and base 26.

Wall 68 may enhance the transmission of temperature changes from one or both of cap 24 and base 26 to the region adjacent hole 54 in which temperature sensor 14 is situated.

Depending on the intended us, wall 68 may be made of different configurations, thicker or thinner, depending on whether in a particular application increased thermal transmission, ambient air flow, or tampering resistance is desired. Those are merely examples of considerations to be taken in shaping wall 68.

The physical characteristics of wall 68 may be applied in the engineering of wall 60 of FIGS. 1 and 2. For example, elongated wall 68 may have an enlarged portion in the region near or including a part of hole 54. In that manner, hole 54 may extend into such an enlarged region while the remainder of wall 68 remains relatively thin. The enlarged region may be sized and configured dependent on the hole size required for thermistor 58 and/or thermal transmissivity and conductivity characteristics of the material of upper portion(s) of the housing, for example.

FIG. 4 illustrates another embodiment of a temperature sensor and housing 100 according to the invention.

Temperature sensor and housing 100 may include an upper portion 118 and a lower portion 122.

As shown, lower portion 122 may be substantially the same as lower portion 22 described above.

Temperature sensor 14, as described above, may likewise be provided.

Temperature sensor 14 may be electrically connected to a control unit by means of wiring 15.

Upper portion 118 may be provided with a wall 160 defined between a cap portion 164 and a base portion 166 of upper portion 118.

Wall 160 may be configured to enhance ambient air movement, and to reduce the chance that stationary ambient air sits adjacent temperature sensor 14, in use, by the use of configured wall portions 170. Configured portions 170 may be substantially concave and/or smooth regions, for example, structured to prevent quiescent zones of little or no air flow in the vicinity of temperature sensor 14.

To further enhance ambient air movement, one or more holes or further openings or recesses 180 may be provided in wall 160.

In the case of multiple holes, some or all of holes or recesses 180 may extend partially or completely through wall 160. In the case where wall 160 encloses temperature sensor 14, in use, then hole 180 may extend through one or more portions of wall 160 to further enhance air flow. A hole 180 extending into wall 160 may be configured to enhance air flow into and around the space in which the temperature sensing element is located. Depending on the intended use, holes 180 may extend partially into wall 160 or into and through wall 160 to fluidly connect the temperature sensing element with the ambient air.

Hole 180 may be sized to enhance ambient air contact with sensor 14, as well as to eliminate tampering with temperature sensor 14. For example, hole 180 may be sized so that an inmate of a prison, a tenant in a building, or an unwitting passerby is unlikely to tamper with sensor 14.

FIG. 5 illustrates another embodiment of a temperature sensor and housing 200 according to the invention.

Temperature sensor 14 described above may be used.

Likewise, housing 122 described immediately above may be used. The temperature sensor housing 218 may be provided with a hole 220 for receiving temperature sensor 14 therein. A wall 260 similar to wall 160 described above may be provided. Wall 260 may be disposed between a cap 264 and a base portion 266. An upper face 268 may be provided on base portion 266.

However, in this FIG. 5 embodiment of the invention, a wall 270 disposed substantially below upper face 268 may be provided at an upper end of hole 220. In that manner, hole 220 provides a completely unitary wall, with no through hole or apertures therein, so that a complete or solid wall 270 free of fluid passages therethrough is provided between an upper portion of temperature sensor 14 and through holes 280, in use, for example.

Thus, even if a foreign object is inserted into through hole 280, no contact will be made with any portion of temperature sensor 14 owing to the solid wall 270 being disposed therebetween.

In addition, the FIG. 5 embodiment may be suited for applications in which relatively short term fluctuations in air temperatures are contemplated, e.g., in a lobby of a building where the opening of a door may allow a short blast of air markedly hotter or colder than the indoor ambient air temperature being monitored.

As will be appreciated, the longer and more frequent such blasts of air hotter or colder than ambient, the more likely that the average ambient temperature will increase or decrease respectively. Thus, the temperature of the upper portion 218 will increase or decrease as a function of that ambient temperature increase or decrease described immediately above. Such increase/decrease in upper portion 218 temperature will translate to a corresponding increase/decrease in the temperature sensed by temperature sensor 14 which, in turn, is transmitted to the associated system; e.g., an HVAC control.

Accordingly, temperature spikes due to brief blasts of hot air through an open lobby door will not cause the temperature sensor to transmit an immediate temperature increase signal to a control. Rather, a modulated temperature increase signal thanks to the lack of direct air contact with temperature sensor 14 in this FIG. 5 embodiment is achieved.

The other embodiments described above have their own virtues which result in accurate temperature readings.

Temperature transmission and ambient air circulation is enhanced, and temperature data is accurately gathered by temperature sensor 14 thanks to configured portions 284 and holes 280, for example.

Any of the above described materials, as well as other materials may be used for the temperature sensor housing, e.g., brass, stainless steel, and wood.

A plate, such as a wall plate 290 may be provided. Wall plate 290 may have a hole or aperture therein with internal threads 294. Threads 294 may be sized to mate with external threads 224 of housing 222.

It is contemplated that all manner of temperature sensors be used.

Examples of temperature sensors are discussed in U.S. Pat. No. 5,022,766 to Phipps which is, and has been, incorporated herein by reference.

The temperature sensor and housing may be used with its own central control system or with a modified control system as requirements dictate. The thermistor may be attached to a standard control system or to a central control unit, as will be readily apparent to a person having ordinary skill in the art.

Wire for the temperature sensor and other connections to control, in use, may be provided by Allerton of Redmond, Wash., Untied States of America, for example. The temperature sensor may be a sheet thermistor or raw thermistor, for example, depending on the requirements of the device.

The upper and lower portions of the housing may be formed of the same or dissimilar materials, or formed of two separate pieces, or as an integral piece.

The lower portion may have a lower coefficient of temperature transmission than the upper portion, so that at least as compared with the upper portion, the lower portion functions as a thermal insulator. The lower and/or upper portion may serve as electrical and electromagnetic insulators as well.

While this invention has been described as having a preferred design, it is understood that it is capable of further modifications, and uses and/or adaptations of the invention and following in general the principle of the invention and including such departures from the present disclosure as come within the known or customary practice in the art to which the invention pertains, and as may be applied to the central features hereinbefore set forth, and fall within the scope of the invention or limits of the claims appended hereto.

What is claimed is:

1. A device comprising:
 a) a housing;
 b) an air passage provided in the housing;
 c) the housing having a configured portion for enhancing ambient air flow around a portion of the passage;
 d) a hole provided in the housing, the hole extending into a region of the housing disposed substantially adjacent the air passage, and a portion of the hole extending substantially adjacent to the configured portion of the housing;
 e) an opening being provided substantially adjacent a portion of the air passage for further enhancing air flow in a region of the hole; and
 f) a temperature sensor disposed in the hole, the temperature sensor being disposed substantially adjacent the opening for further enhancing air flow in the configured portion of the housing.

2. A device as in claim 1, wherein:
 a) the configured portion prevents air in the air passage from contacting the temperature sensor disposed in the hole.

3. A device as in claim 1, wherein:
 a) a recess is provided in the configured portion to enhance air flow in the region of the hole.

4. A device as in claim 1, wherein:
 a) an aperture is provided in the configured portion to provide air flow between the air passage and the temperature sensor disposed in the hole; and
 b) the aperture fluidly connects the air passage and the hole.

5. A device as in claim 1, wherein:
 a) a recess is provided in the configured portion to provide air flow adjacent the opening and the hole in which the temperature sensor is disposed.

6. A device as in claim 1, wherein:
 a) the configured portion includes a cylindrical wall.

7. A temperature sensing device, comprising:
 a) a housing having a cap and a spaced apart base;
 b) an air passage being provided between the cap and the base, the air passage providing air flow between the cap and the base;
 c) a wall disposed between the cap and the base, the wall enhancing air flow in the air passage between the cap and the base;
 d) a recess is provided in the wall;
 e) a hole provided in the base and in at least a portion of the wall;
 f) a temperature sensor being disposed inside the hole and located substantially adjacent the wall;
 g) the temperature sensor being disposed in the hole and substantially adjacent the recess in the wall; and
 h) the wall preventing contact between air in the air passage and the temperature sensor disposed in the hole.

8. A device as in claim 7, wherein:
 a) a further recess is provided in the wall to enhance air flow in the region of the hole.

9. A device as in claim 7, wherein:
 a) an aperture is provided in the wall to provide air flow between the air passage and the temperature sensor disposed in the hole; and
 b) the aperture fluidly connects the air passage and the hole.

10. A device as in claim 7, wherein:
a) a further recess is provided in the wall to provide air flow adjacent the recess and the hole in which the temperature sensor is disposed.

11. A device as in claim 7, wherein:
a) the wall extends substantially across a width of at least one of the cap and the base.

12. A device as in claim 7, wherein:
a) an external thread is provided on the housing, the external thread being configured for engaging a support surface.

* * * * *